United States Patent
Bhat et al.

(10) Patent No.: US 10,051,074 B2
(45) Date of Patent: Aug. 14, 2018

(54) TECHNIQUES FOR MANAGING DEVICES NOT DIRECTLY ACCESSIBLE TO DEVICE MANAGEMENT SERVER

(75) Inventors: Kong Posh Bhat, Plano, TX (US); Nhut Nguyen, Richardson, TX (US)

(73) Assignee: SAMSUNG ELECTRONICS CO, LTD., Suwon-si (KR)

( * ) Notice: Subject to any disclaimer, the term of this patent is extended or adjusted under 35 U.S.C. 154(b) by 404 days.

(21) Appl. No.: 13/053,076

(22) Filed: Mar. 21, 2011

(65) Prior Publication Data
US 2011/0238806 A1 Sep. 29, 2011

Related U.S. Application Data

(60) Provisional application No. 61/318,610, filed on Mar. 29, 2010, provisional application No. 61/369,982, filed on Aug. 2, 2010.

(51) Int. Cl.
*G06F 15/173* (2006.01)
*H04L 29/08* (2006.01)
(Continued)

(52) U.S. Cl.
CPC .......... *H04L 67/28* (2013.01); *H04L 41/0233* (2013.01); *H04L 67/125* (2013.01);
(Continued)

(58) Field of Classification Search
CPC ......... G06F 21/57; G06F 9/4416; H04L 67/28
(Continued)

(56) References Cited

U.S. PATENT DOCUMENTS 6,338,112 B1 * 1/2002 Wipfel et al. ................ 710/269
6,993,657 B1 * 1/2006 Renner et al. ............... 713/182
(Continued)

FOREIGN PATENT DOCUMENTS

CN 101251806 A 8/2008
CN 101365148 A 2/2009
(Continued)

OTHER PUBLICATIONS

Open Mobile Alliance, "OMA Device Management Bootstrap, OMA-TS-DM_Bootstrap-V2_0-20101006-D," Draft Version 2.0, Oct. 6, 2010, San Diego, CA, 29 pages.
(Continued)

*Primary Examiner* — Kevin Bates
*Assistant Examiner* — Clarence McCray

(57) ABSTRACT

Methods and devices for managing devices not directly accessible to device management server are provided. A device for communicating a Location Update Alert message to a Device Management (DM) Server via a DM Gateway includes a memory for storing code of a DM client and a plurality of DM MOs, each of the plurality of DM MOs including one or more nodes, a processor for executing the code of the DM client stored in the memory, a communications unit for receiving and sending messages for the DM client, and the DM client for communicating a Location Update Alert message to the DM Server via the DM Gateway upon detecting a change in an address of the device, based on a LocationUpdate node of at least one of the plurality of DM MOs.

30 Claims, 12 Drawing Sheets

(51) Int. Cl.
*H04L 12/24* (2006.01)
*H04W 4/50* (2018.01)
*H04L 29/12* (2006.01)

(52) U.S. Cl.
CPC ............... *H04L 67/34* (2013.01); *H04W 4/50* (2018.02); *H04L 41/08* (2013.01); *H04L 61/2589* (2013.01)

(58) Field of Classification Search
USPC ........................................................ 709/223
See application file for complete search history.

(56) References Cited

U.S. PATENT DOCUMENTS

| | | | |
|---|---|---|---|
| 7,388,869 B2* | 6/2008 | Butehorn et al. | 370/401 |
| 7,516,219 B2* | 4/2009 | Moghaddam et al. | 709/225 |
| 7,533,172 B2* | 5/2009 | Traversat et al. | 709/225 |
| 7,533,407 B2* | 5/2009 | Lewis et al. | 726/6 |
| 7,601,462 B2* | 10/2009 | Im et al. | 429/223 |
| 7,604,162 B2* | 10/2009 | Li | H04L 41/046 235/376 |
| 7,631,346 B2* | 12/2009 | Hinton et al. | 726/8 |
| 7,664,836 B2* | 2/2010 | Kim | 709/222 |
| 7,707,286 B2* | 4/2010 | Gundu et al. | 709/224 |
| 7,720,784 B1* | 5/2010 | Froloff | A61B 5/165 600/300 |
| 7,974,613 B1* | 7/2011 | Shanker et al. | 455/419 |
| 7,983,226 B2 | 7/2011 | Oommen et al. | |
| 7,991,878 B2* | 8/2011 | Li et al. | 709/224 |
| 8,095,601 B2* | 1/2012 | Hasha et al. | 709/206 |
| 8,095,634 B2* | 1/2012 | Rao | 709/223 |
| 8,095,674 B2* | 1/2012 | Ye et al. | 709/229 |
| 8,194,642 B2* | 6/2012 | Rosenberg et al. | 370/352 |
| 8,244,845 B2* | 8/2012 | Rao | 709/223 |
| 8,285,797 B2* | 10/2012 | Trayer et al. | 709/206 |
| 8,300,578 B2* | 10/2012 | Patil et al. | 370/328 |
| 8,321,552 B2* | 11/2012 | Luo et al. | 709/223 |
| 8,977,968 B2* | 3/2015 | Fan | H04W 24/06 455/423 |
| 9,323,515 B1* | 4/2016 | Daley | G06F 8/65 |
| 2002/0090935 A1* | 7/2002 | Anzai | H04M 1/72552 455/412.1 |
| 2003/0217137 A1* | 11/2003 | Roese et al. | 709/223 |
| 2004/0132451 A1* | 7/2004 | Butehorn et al. | 455/445 |
| 2005/0055397 A1* | 3/2005 | Zhu et al. | 709/200 |
| 2005/0078708 A1* | 4/2005 | Bender et al. | 370/475 |
| 2005/0105524 A1* | 5/2005 | Stevens et al. | 370/389 |
| 2005/0131997 A1* | 6/2005 | Lewis et al. | 709/203 |
| 2006/0203722 A1* | 9/2006 | Oommen | H04L 41/509 370/229 |
| 2006/0218628 A1* | 9/2006 | Hinton et al. | 726/8 |
| 2006/0236382 A1* | 10/2006 | Hinton et al. | 726/8 |
| 2007/0089125 A1* | 4/2007 | Claassen | H04H 60/33 725/9 |
| 2007/0093243 A1* | 4/2007 | Kapadekar et al. | 455/419 |
| 2007/0149243 A1* | 6/2007 | Hwang | H04W 40/02 455/551 |
| 2007/0280256 A1* | 12/2007 | Forslow | H04W 4/10 370/395.2 |
| 2007/0294385 A1* | 12/2007 | Kapadekar et al. | 709/223 |
| 2008/0021866 A1* | 1/2008 | Hinton et al. | 707/2 |
| 2008/0065753 A1* | 3/2008 | Rao | 709/223 |
| 2008/0114570 A1* | 5/2008 | Li | H04L 41/0233 702/186 |
| 2008/0133767 A1* | 6/2008 | Birrer | H04L 65/4076 709/231 |
| 2008/0153554 A1* | 6/2008 | Yoon | H04M 1/72547 455/567 |
| 2008/0209018 A1* | 8/2008 | Hernandez et al. | 709/222 |
| 2008/0209196 A1 | 8/2008 | Hernandez et al. | |
| 2008/0244049 A1* | 10/2008 | Normark et al. | 709/223 |
| 2008/0248792 A1* | 10/2008 | Gundu | 455/422.1 |
| 2008/0294741 A1* | 11/2008 | Dos Santos | G06Q 10/107 709/206 |
| 2009/0016617 A1* | 1/2009 | Bregman-Amitai | G06K 9/00281 382/229 |
| 2009/0055484 A1* | 2/2009 | Vuong | G06Q 10/107 709/206 |
| 2009/0201917 A1* | 8/2009 | Maes | H04L 12/66 370/352 |
| 2009/0270092 A1* | 10/2009 | Buckley | H04W 48/20 455/434 |
| 2009/0271781 A1* | 10/2009 | Cui | G06F 8/61 717/173 |
| 2010/0037088 A1* | 2/2010 | Krivopaltsev | H04L 41/0681 714/4.1 |
| 2010/0142434 A1* | 6/2010 | Rodmell et al. | 370/315 |
| 2010/0151889 A1* | 6/2010 | Chen | G06F 17/30976 455/466 |
| 2010/0186088 A1* | 7/2010 | Banerjee et al. | 726/23 |
| 2010/0299739 A1* | 11/2010 | Chai | H04L 12/24 726/9 |
| 2011/0032869 A1* | 2/2011 | Natan | G06F 9/4416 370/328 |
| 2011/0047253 A1* | 2/2011 | Bhat | H04L 41/04 709/221 |
| 2011/0196974 A1* | 8/2011 | Maes | H04L 65/104 709/228 |
| 2011/0196980 A1* | 8/2011 | Maes | H04L 65/1006 709/230 |
| 2012/0003962 A1* | 1/2012 | Jeon | H04W 36/0083 455/411 |
| 2012/0143987 A1* | 6/2012 | Bhat | H04W 4/001 709/217 |
| 2012/0239936 A1* | 9/2012 | Holtmanns et al. | 713/176 |
| 2012/0303822 A1* | 11/2012 | Huang et al. | 709/227 |
| 2013/0151344 A1* | 6/2013 | Tavares et al. | 705/14.65 |
| 2014/0088954 A1* | 3/2014 | Shirzadi | G06F 17/24 704/9 |
| 2014/0379328 A1* | 12/2014 | Kim | G06F 17/276 704/9 |
| 2015/0058273 A1* | 2/2015 | Coden | G06F 21/32 706/52 |
| 2015/0180746 A1* | 6/2015 | Day, II | H04L 51/16 455/405 |
| 2015/0295867 A1* | 10/2015 | DeLuca | H04L 51/32 709/206 |

FOREIGN PATENT DOCUMENTS

| | | | |
|---|---|---|---|
| CN | 101442566 A | 5/2009 | |
| CN | 101658065 A | 2/2010 | |
| EP | 2061209 A1 * | 5/2009 | H04L 29/06 |
| JP | 2007-181219 A | 7/2007 | |
| KR | 10-2006-0070848 A | 6/2006 | |
| KR | 10-2007-0113823 A | 11/2007 | |

OTHER PUBLICATIONS

Open Mobile Alliance, "GwMO Requirements, OMA-RD-GwMO-V1_0-2010713-D," Draft Version 1.0, Jul. 13, 2010, San Diego, CA, 15 pages.
Open Mobile Alliance, "Gateway Management Object Architecture, OMA-AD-GwMO-V1-0-20101223-D," Draft Version 1.0, Dec. 23, 2010, San Diego, CA, 13 pages.
Samsung Electronics, "End Device Bootstrapping Issues, OMA-DM-GwMO-2010-0030," Open Mobile Alliance, Aug. 2, 2010, San Diego, CA, 8 pages.
Communication from a foreign patent office in a counterpart foreign application, European Patent Office, "Supplementary European Search Report," European Application No. EP 11 76 2988, Sep. 27, 2017, 11 pages.

* cited by examiner

```
<Alert>
 <CmdID>2</CmdID>
 <Data>1226</Data>                            <!-- Generic Alert -->
 <Item>
   <Source><LocURI>mac: 01-ab-34-ef-69-0c</LocURI></Source>
   <Target><LocURI>http://www.somecorporation.com/DMServer</LocURI></Target>
   <Meta>
     <Type xmlns="syncml:metinf">
       urn:oma:gwmo:1.0:LocationUpdate
     </Type>
     <Format xmlns="syncml:metinf">text/plain</Format>
   </Meta>
   <Data>
     <![CDATA[
       <HwAddr> mac: 01-ab-34-ef-69-0c</HwAddr>      <!--Hardware Address -->
       <OldAddr>206.67.236.207</OldAddr>              <!--Old Address -->
       <NewAddr>80.239.230.168</NewAddr>              <!--New Address -->
     ]]>
   </Data>
 </Item>
</Alert>
```

FIG. 6

```
<Alert>
 <CmdID>2</CmdID>
 <Data>1226</Data>                              <!-- Generic Alert -->
 <Item>
    <Source><LocURI>mac: 01-ab-34-ef-69-0c</LocURI></Source>
    <Target><LocURI>192.168.4.1</LocURI></Target>
    <Meta>
       <Type xmlns="syncml :metinf">
          urn:oma:gwmo:1.0:BootstrappedDMSList
       </Type>
       <Format xmlns="syncml:metinf">text/plain</Format>
    </Meta>
    <Data>
       <![CDATA[
          <ServerList>
             <Server>http://www.somevendor.com/CMServer</Server>
             <Server>http://www.somevendor.com/FMServer</Server>
          </ServerList>
       -- ]]>
    </Data>
 </Item>
</Alert>
```

FIG. 8

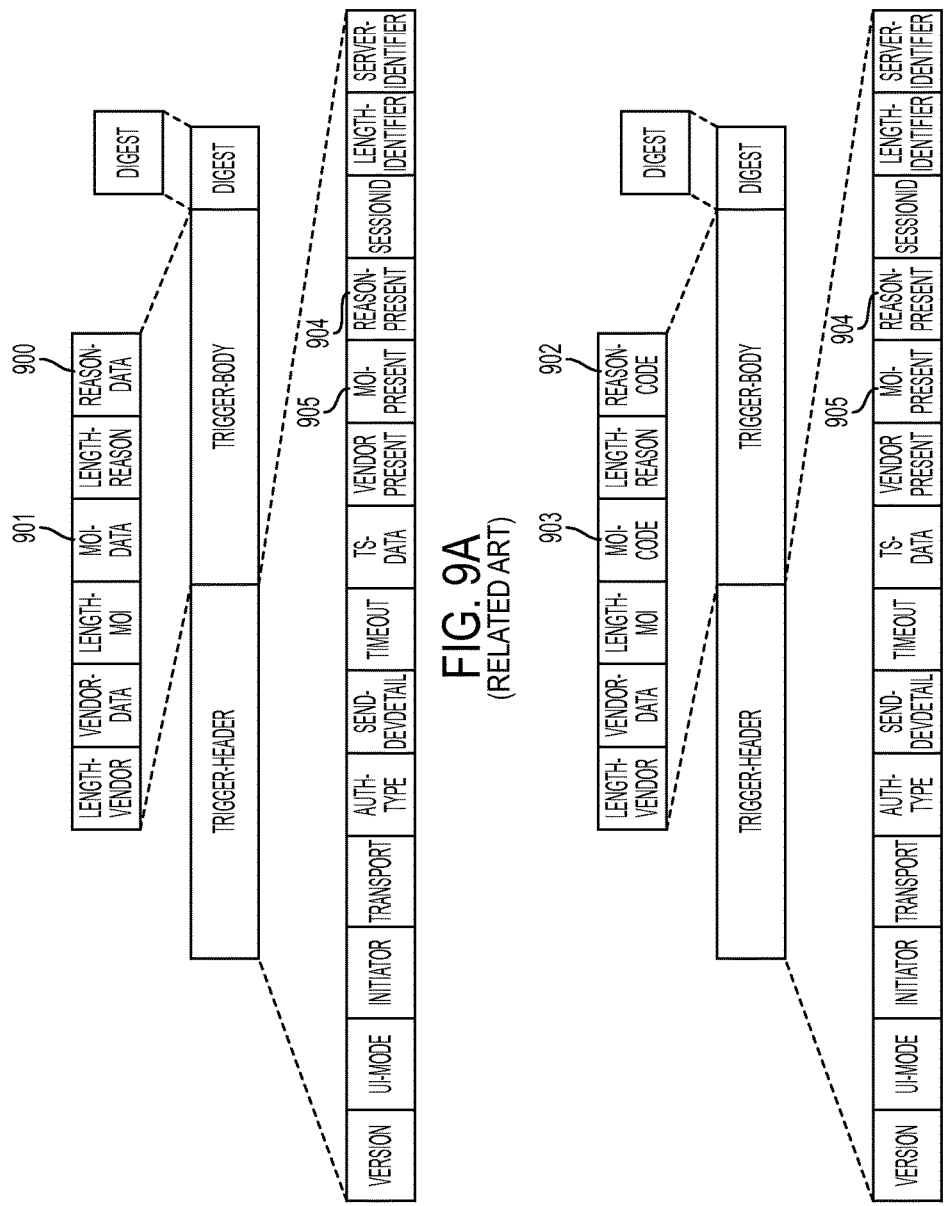

TECHNIQUES FOR MANAGING DEVICES NOT DIRECTLY ACCESSIBLE TO DEVICE MANAGEMENT SERVER

CROSS-REFERENCE TO RELATED APPLICATIONS

This application claims the benefit under 35 U.S.C. § 119(e) of a U.S. provisional patent application filed on Mar. 29, 2010 in the U.S. Patent and Trademark Office and assigned Ser. No. 61/318,610, and a U.S. provisional patent application filed on Aug. 2, 2010 in the U.S. Patent and Trademark Office and assigned Ser. No. 61/369,982, the entire disclosure of each of which is hereby incorporated by reference.

BACKGROUND OF THE INVENTION

1. Field of the Invention

The present invention relates to Device Management (DM) in a communication system. More particularly, the present invention relates to techniques for managing devices that are not directly accessible to a DM Server.

2. Description of the Related Art

With the growth in ubiquitous communications technologies and systems, devices are increasing in functionality and complexity. However, with the increase in the functionality and complexity of the devices, a need for the management of the devices has developed. To address that need, the Open Mobile Alliance (OMA) established a Device Management (DM) Working Group to specify protocols and mechanisms that achieve management of devices. The OMA DM Working Group has developed the OMA-DM specification, which defines a two-way protocol between a DM Server and a DM Client associated with a device that is used for remote management of the device. Historically, the devices have been wireless devices, but of late, OMA-DM has begun addressing the remote management needs of wired devices as well. Examples of OMA-DM include the setting of initial configuration information in devices, the subsequent installation and update of persistent information in devices, the retrieval of management information from devices, and the processing of events and alarms generated by devices.

An instance of an interaction between a DM sever and a DM Client is referred to as a DM session and may be initiated by either the DM Client or the DM Server. The DM Client typically embedded at the device and the DM Server manages the device by invoking one or more commands on the DM Client. The DM Client processes the one or more commands and communicates a response back to the DM Server. Communication between the DM Server and the DM Client is implemented via the exchange of Synchronization Markup Language (SyncML) messages.

An example of a communication system employing OMA-DM is described below with reference to FIG. 1.

FIG. 1 illustrates an exemplary communication system employing OMA-DM according to the related art.

Referring to FIG. 1, the exemplary communication system employing OMA-DM may include a wired network 100, a wireless network 102, a wired device 110, a wireless device 112, a DM Server 120, and a DM Authority 130. Each of the wired device 110 and the wireless device 112 has associated therewith a DM Client (not shown). In addition, the DM Authority 130 may be an Operations Support System (OSS). In FIG. 1, solid lines represent physical connectivity and dotted lines represent logical connectivity.

The exemplary communication system employing OMA-DM illustrated in FIG. 1 is merely one of a number of possible implementations. For example, one of the wired network 100 and the wireless network 102 may be omitted. Alternatively, the wired network 100 and the wireless network 102 may be combined. Further, while the DM Server 120 and the DM Authority 130 are shown as connected to the wired network 100, one or both of the DM Server 120 and the DM Authority 130 may alternatively be connected to the wireless network 102.

To facilitate OMA-DM in the communication system illustrated in FIG. 1, a two-way protocol based on the OMA-DM specification is utilized between the DM Server 120 and the DM Client associated with wireless device 112, and between the DM Server 120 and the DM Client associated with the wired device 110. The DM Authority 130 may direct the DM operations of the DM Client associated with each of the wired device 110 and wireless device 112 via the DM Server 120. Only the interaction between the DM Server 120 and a DM Client associated with each of the wired device 110 and wireless device 112, is within the scope of the OMA-DM specification.

An example of a DM Server initiated DM session with a DM Client is described below with reference to FIG. 2.

FIG. 2 is a signal diagram for a DM Server initiated DM session with a DM Client in a communication system according to the related art.

Referring to FIG. 2, the DM Server initiated DM session between a DM Server 202 and a DM Client 204 includes two phases. The first phase is a setup phase 210 and the second phase is a management phase 220. The setup phase 210 includes an exchange of information for authentication and device information. The exchange of information in the setup phase 210 includes one instance of each of three packages, namely Package 0 (212), Package 1 (214), and Package 2 (216). Package 0 (212) is communicated from DM Server 202 to DM Client 204 and is referred to as a Notification Message. Package 1 (214) is communicated from DM Client 204 to DM Server 202. Package 1 (214) includes client initialization information and device information. The client initialization information includes client credentials. Package 2 (216) is sent from DM Server 202 to DM Client 204. Package 2 (216) includes server initialization information and an initial management operation. The server initialization information includes one or more server credentials.

The management phase 220 includes the exchange of one or more instances of two types of packages, namely Package 3 (222), and Package 4 (224). Package 3 (222) is communicated from DM Client 204 to DM Server 202. Package 3 (222) includes client response information to the management operation triggered by Package 2 (216). Package 4 (224) is communicated from DM Server 202 to DM Client 204. Package 4 (224) includes at least one of an additional management operation and one or more additional user interaction commands, if the DM session is continued beyond the Package 2 message 216. Additional cycles of a Package 3 message 222 and a Package 4 message 224 may be transmitted between the DM Server 202 and DM Client 204 until the DM session is terminated.

The OMA-DM protocol supports the notion of DM bootstrapping. DM bootstrapping is the process by which a DM Client transitions from an un-provisioned, empty state, to a state where it is able to initiate a DM session with an authorized DM Server. A DM Client that has already been bootstrapped can be further bootstrapped to enable the DM Client to initiate a DM session with a new DM Server. An example of the OMA-DM architecture is described below with reference to FIG. 3.

FIG. 3 illustrates an OMA-DM architecture according to the related art.

Referring to FIG. 3, the OMA-DM architecture includes a DM Server 340, a DM Client 310 and DM standard Management Objects (MOs) 320. The DM Client 310 and the DM standard MOs 320 are co-located in a device 300. The OMA-DM architecture may include additional structural elements. However, a description of additional structural elements of the OMA-DM architecture is omitted for conciseness.

The DM Server 340 and DM Client 310, which have been described above, communicate via interfaces DM-1 330 and DM-2 332. DM Client 310 communicates via interface DM-5 334 with the DM Standard MOs 320.

The DM protocol defines three standard Management Objects (MOs) 320 that all implementations of a DM Client 310 must support. These DM standard MOs 320 include DMAccount (DMAcc) MO 322, Device Information (DevInfo) MO 324 and Device Details (DevDetail) MO 326.

The DMAcc MO 322 is used to manage information pertaining to bootstrapped DM Server 340. There is a single instance of the DMAcc MO 322 for each bootstrapped DM Server 340. For each DM Server 340 that has been successfully bootstrapped for DM device 310, the corresponding DMAcc MO 322 maintains information on a DM Server IDentifier (ID), connectivity information, server address, server and client credentials, etc. The DevInfo MO 324 provides basic information about the device 300 associated with the DM Client 310. The basic information includes a device ID, a device manufacturer ID, a model ID, and language settings. The DevDetail MO 326 provides additional information about the device 300 associated with the DM Client 310. The additional information includes device type, Original Equipment Manufacturer (OEM), hardware version, firmware version, software version, an indication of whether the device 300 supports optional features (e.g., large-object handling capability), maximum depth of the management tree, maximum total length of any Uniform Resource ID (URI), and maximum total length of any URI segment.

The OMA DM standard specifies that OMA DM MOs be represented as a tree of named nodes. An example of a OMA DMAcc MO node tree according to the related art is provided in FIG. 4 as an example of an OMA DM MO node tree.

FIG. 4 illustrates a DMAcc MO node tree according to the related art.

Referring to FIG. 4, a pictorial description of a tree of named nodes of a DMAcc MO of the related art is shown. The nodes depicted in FIG. 4 are outside the scope of the present disclosure and therefore a description of each node is omitted herein for conciseness. A description of each node depicted in FIG. 4 can be found in section 5.3.1 of version 1.2.1 of the OMA DM Standardized Objects, the entire disclosure of which is hereby incorporated by reference.

Each node in a MO is the potential target for invoking a management operation from the DM Server. In order to perform some remote management action, the DM Server executes an operation on the corresponding node. Nodes are addressed using a URI. The URI of a node is the concatenation of the names of all the nodes from the root of the management tree, using '/' as the delimiter. For example, the URI of the "Name" node of the DMAcc MO shown in FIG. 4 is "Node:<x>/Name".

As indicated above, OMA-DM was originally developed as a management protocol for hand-held wireless devices. Accordingly, OMA-DM is based on the premise that the DM Server and the DM Client can directly communicate with each other once the DM bootstrapping procedure has been successfully completed. Most commonly, the DM Server requests a DM session with the DM Client by sending a specially formatted Short Message Service (SMS) message to the DM Client. Upon receiving the message, the DM Client authenticates the DM Server and establishes the DM session.

In this era of convergence, as the delineation between wireline and wireless service providers disappears, OMA-DM is being extended to manage categories of devices that have traditionally not supported OMA-DM. For many of these devices, direct communication between the DM Server and the DM Client is not possible. This can happen for various reasons. For example, direct communication between the DM Server and the DM Client may not be possible if the device does not have a publicly routable address, such as a Mobile Subscriber (MS) Integrated Services Digital Network (ISDN) Number (MSISDN). Also, direct communication between the DM Server and the DM Client may not be possible if the device is deployed behind a gateway that provides a Network Address Translation (NAT) and/or firewall functionality. In addition, direct communication between the DM Server and the DM Client may not be possible if the device supports a management protocol other than OMA-DM (i.e. the device does not have an embedded OMA-DM Client).

To address the issues listed above with respect to the direct communication between the DM Server and the DM Client not being possible, a DM Gateway is being investigated in order to address some of the challenges described above. A DM Gateway is an entity that facilitates interaction between a DM Server and a DM Client, at least one of which runs OMA-DM, in situations where direct and unaided interaction between the DM Server and the DM Client is not possible. Unlike in the current OMA-DM paradigm, the DM Gateway is expected to play a major role in the management of devices. Accordingly, a Gateway MO (GwMO) enabler is being developed.

The GwMO enabler, that is being developed, aims to address the issue of managing end devices that are not directly accessible to the DM Server either because the devices are deployed behind a device that provides NAT and/or firewall functionality, or because the devices do not support the OMA-DM protocol. The GwMO enabler defines the following modes of operation for the DM Gateway:

Transparent Mode: The DM Gateway maintains a mapping between the local/private and global/public identity of the device to assist the DM Server in sending a notification to the DM Client deployed behind the DM Gateway. Additionally, the DM Gateway does not participate in the management session that gets established between the DM Server and the DM Client.

Proxy Mode: The DM Gateway manages devices on behalf of the OMA-DM Server. It plays the role of the DM Server for the end device and the role of the DM Client for the DM Server.

Adaptation Mode: The DM Gateway manages non-OMA-DM devices on behalf of the OMA-DM Server over a device supported protocol.

In the current OMA-DM paradigm, the OMA-DM Client responds to management commands from only those DM Servers with which a trusted relationship has been established via the DM Bootstrapping process. If the OMA-DM Client receives a management command from a DM Server with which it has not been previously bootstrapped, the DM Client silently discards the message.

If the current OMA-DM paradigm is extended to the DM Gateway as well, the DM Gateway will forward messages destined for an end device only if the originating DM Server is one with which the DM Gateway is itself bootstrapped. In other words, the case where the end device is bootstrapped to a DM Server, but the DM Gateway is not bootstrapped to the same DM Server, is not supported. The reason for this is that if an un-bootstrapped DM Server sends a message to the DM Gateway, for forwarding to the end device, the DM Client running on the DM Gateway will simply reject the message and not forward it to the target device.

Accordingly, there is a need for the DM Gateway to forward a command from a DM Server to the target device, even though the DM Gateway itself is not bootstrapped to the DM Server. An example of a case where this functionality is needed is where an end device is pre-bootstrapped to a vendor's diagnostics DM Server but the DM Gateway itself does not have a trusted relationship with the vendor's DM Server.

SUMMARY OF THE INVENTION

An aspect of the present invention is to address at least the above-mentioned problems and/or disadvantages and to provide at least the advantages described below. Accordingly, an aspect of the present invention is to provide techniques for managing devices that are not directly accessible to a Device Management (DM) Server.

In accordance with an aspect of the present invention, a device for performing Device DM Gateway bootstrapping is provided. The device includes a memory for storing code of a DM client and a plurality of DM Management Objects (MOs), each of the plurality of DM MOs including one or more nodes, a processor for executing the code of the DM client stored in the memory, a communications unit for receiving and sending messages for the DM client, and the DM client for performing the DM Gateway bootstrapping based on at least one node included in at least one of the plurality of DM MOs.

In accordance with another aspect of the present invention, a device for communicating a Location Update Alert message to a DM Server via a DM Gateway is provided. The device includes a memory for storing code of a DM client and a plurality of DM MOs, each of the plurality of DM MOs including one or more nodes, a processor for executing the code of the DM client stored in the memory, a communications unit for receiving and sending messages for the DM client, and the DM client for communicating a Location Update Alert message to the DM Server via the DM Gateway upon detecting a change in an address of the device, based on a LocationUpdate node of at least one of the plurality of DM MOs.

In accordance with yet another aspect of the present invention, a method for operating a device including a DM Client to communicate a Location Update Alert message to a DM Server is provided. The method includes determining whether an address of the device has changed from other than one local address to another local address, if it is determined that the address change from other than one local address to another local address, determining whether at least one DM Account (DMAcc) MO is located for which a LocationUpdate node has a value set to true, if at least one DMAcc MO is located for which the LocationUpdate node has a value set to true, determining whether there is at least one DM Gateway in Proxy or Adaptation mode, if it is determined that there is at there is not at least one DM Gateway in Proxy or Adaptation mode, directly communicating the Location Update Alert message to any DM Server associated with the at least one DMAcc MO for which the LocationUpdate node has a value set to true, and if it is determined that there is at there is at least one DM Gateway in Proxy or Adaptation mode, communicating the Location Update Alert message to any DM Gateway that is in the Proxy or Adaptation mode and associated with the at least one DMAcc MO for which the LocationUpdate node has a value set to true.

In accordance with still another aspect of the present invention, a method of transmitting a notification message from a DM Server is provided. The method includes generating the notification message, and transmitting the notification message, wherein the notification message includes a header and a body, the body of the notification message including at least one of a <moi-code> field and a <reason-code> field.

In accordance with yet another aspect of the present invention, a method for a DM Gateway to process messages from a DM server is provided. The method includes receiving a message from a DM server for a target device associated with the DM Gateway, determining whether the DM Gateway is bootstrapped to the DM Server that sent the message, if it is determined that the DM Gateway is not bootstrapped to the DM Server that sent the message, determining whether the DM Gateway should forward the message to the target device despite the DM Gateway not being bootstrapped to the DM Server that sent the message, and if it is determined that the DM Gateway should forward the message to the target device despite the DM Gateway not being bootstrapped to the DM Server that sent the message, forwarding the message to the target device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 illustrates a Location Update Alert Synchronization Markup Language (SyncML) message according to an exemplary embodiment of the present invention;

FIG. 8 illustrates a Bootstrapped DM Server List Alert SyncML message according to an exemplary embodiment of the present invention;

FIG. 9A illustrates a structure of a Notification Message including <reason-data> and <moi-data> fields according to the related art;

FIG. 9B illustrates a structure of the Notification Message including <reason-code> and <moi-code> fields according to an exemplary embodiment of the present invention;

Throughout the drawings, like reference numerals will be understood to refer to like parts, components, and structures.

DETAILED DESCRIPTION OF EXEMPLARY EMBODIMENTS

Figure 1:
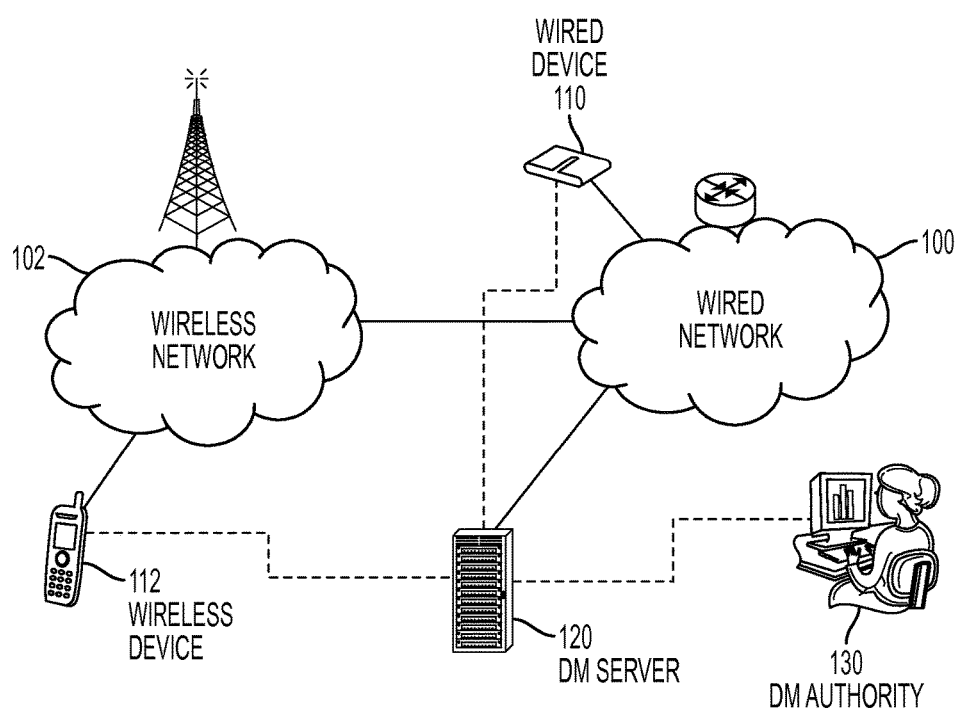
FIG. 1 illustrates an exemplary communication system employing Open Mobile Alliance (OMA)-Device Management (DM) according to the related art.
Figure 2:
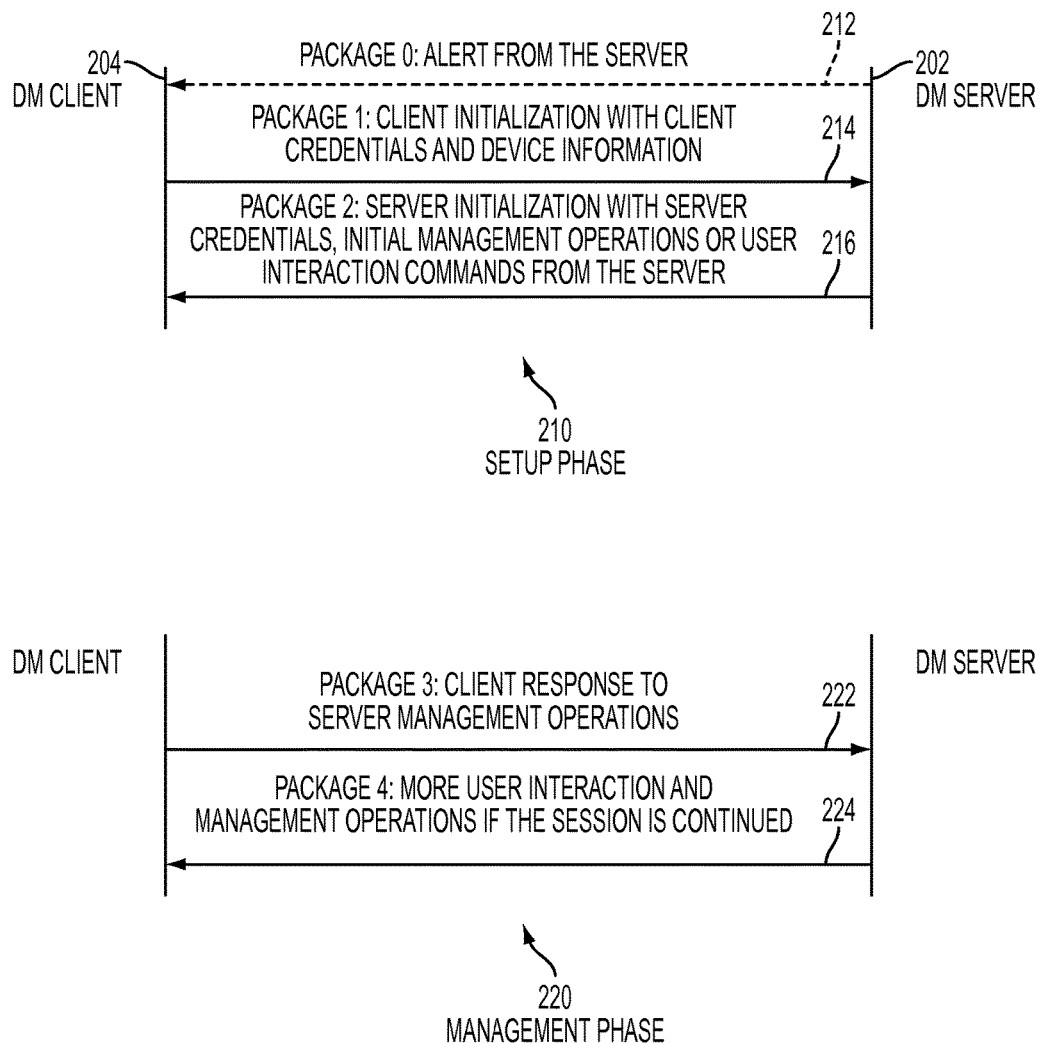
FIG. 2 is a signal diagram for a DM Server initiated DM session with a DM Client in a communication system according to the related art.
Figure 3:
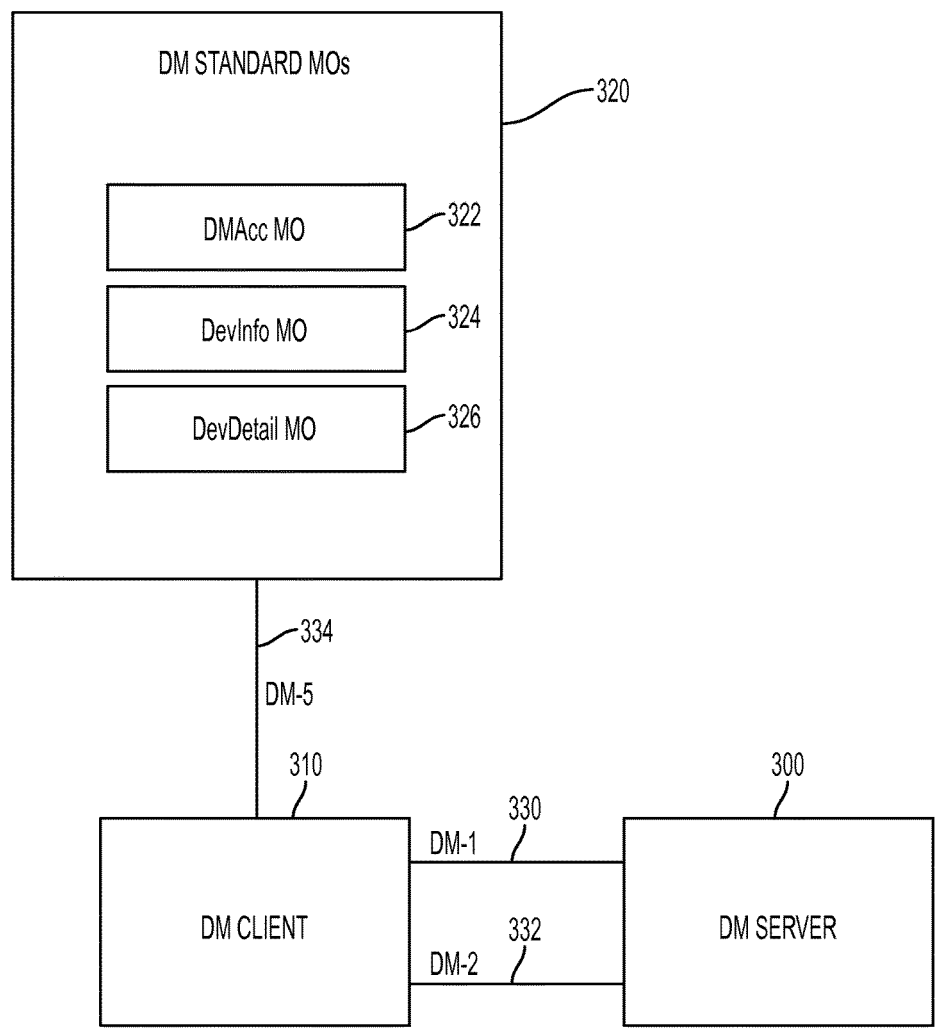
FIG. 3 illustrates an OMA-DM architecture according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to techniques for Device Management (DM) in a communication system. More particularly, exemplary embodiments of the present invention described below relate to techniques for managing devices that are not directly accessible to a DM Server. While the techniques for managing devices that are not directly accessible to a Device Management (DM) Server may be described below in the context of Open Mobile Alliance (OMA)-DM and/or the OMA Gateway Management Object (GwMO) enabler, the present invention is not limited thereto and is similarly applicable to other DM or other OMA-DM enablers. Hereafter, a gateway device to support DM in a communication system is referred to as a DM Gateway.

It is noted that when the term "device" is referred to, the term "device" may be inclusive of an associated DM Client running on the device. Further, it is noted that while exemplary embodiments of the present invention are described in the context of a single DM Server and a single device for a given DM Gateway, any number of DM Servers and/or devices may be utilized with the given DM Gateway. While the DM Gateway may be physically located anywhere in a communication system, preferably, the DM Gateway is logically disposed between a DM Server and a device.

It should be understood that the following description may refer to terms utilized in various standards merely for simplicity in explanation. For example, the following description may refer to terms utilized in one of the OMA standards, such as the OMA-DM standard. However, this description should not be interpreted as being limited to such standards. Independent of the mechanism used to manage devices that are not directly accessible to a DM Server, it is advantageous for that ability to conform to a standardized mechanism.

Described below are enhancements to OMA-DM protocol to provide the remote management of devices that are not directly accessible to a DM Server, according to exemplary embodiments of the present invention. Such devices include devices that are deployed behind a DM Gateway that provides a Network Address Translation (NAT) and/or firewall functionality, nomadic devices that don't have a globally routable address, and devices that do not have an embedded OMA-DM Client. In order to maintain backward compatibility with legacy versions of OMA-DM, the enhancements to OMA-DM according to exemplary embodiments of the present invention do not deviate from the conventional DM transaction model or control flow.

Also described below, are enhancements to the OMA-DM protocol to enable a DM Gateway to forward messages from a DM Server to an associated device in the case where the DM Gateway is not bootstrapped to the DM Server in question whereas the associated device is.

DM Gateway Bootstrapping

As described above, in OMA-DM, bootstrapping is the process by which a device moves from an un-provisioned, empty state, to a state where it is able to initiate a management session to a DM Server. According to an exemplary embodiment of the present invention, the concept of DM Bootstrapping may be extended to DM Gateways.

Figure 4:
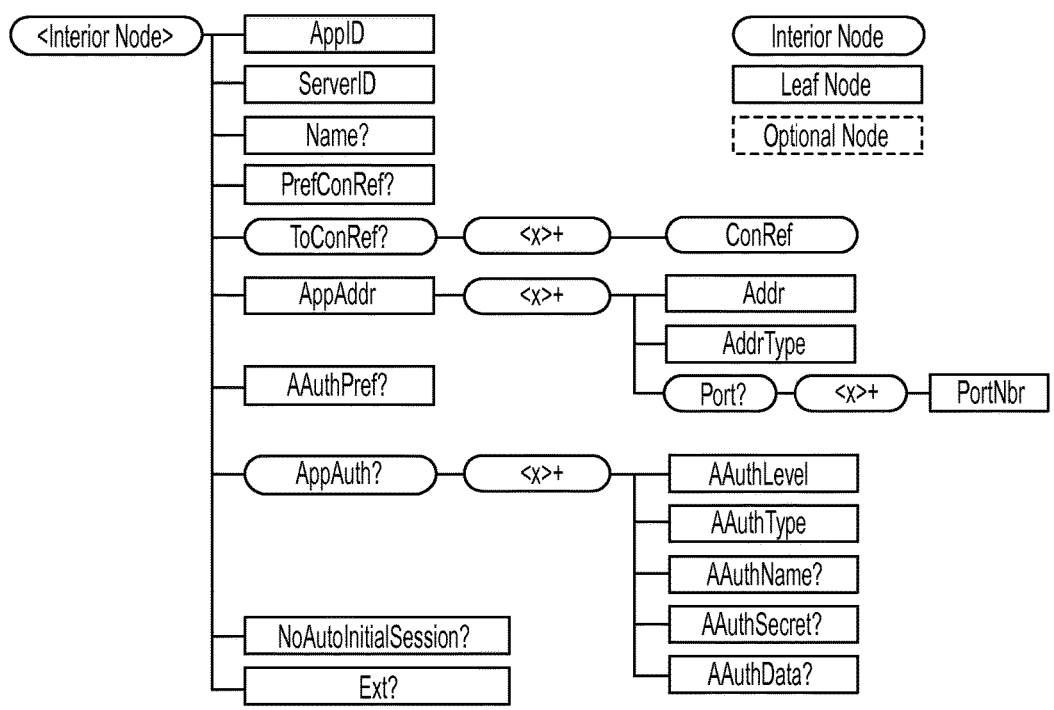
FIG. 4 illustrates DMAccount (DMAcc) Management Object (MO) node tree according to the related art.

In one exemplary embodiment of the present invention, a new MO may be defined that includes a parent node and all leaf nodes pertaining to Gateway bootstrapping. In this exemplary embodiment of the present invention, the DMAcc MO may provide references to pertinent instances of the new MO. In another exemplary implementation, a plurality of new nodes is added to the DMAccount (DMAcc) Management Object (MO) of the related art, such as the DMAcc MO described above with respect to FIG. 4. A DMAcc MO according to an exemplary embodiment of the present invention is described below with reference to FIG. 5.

Figure 5:
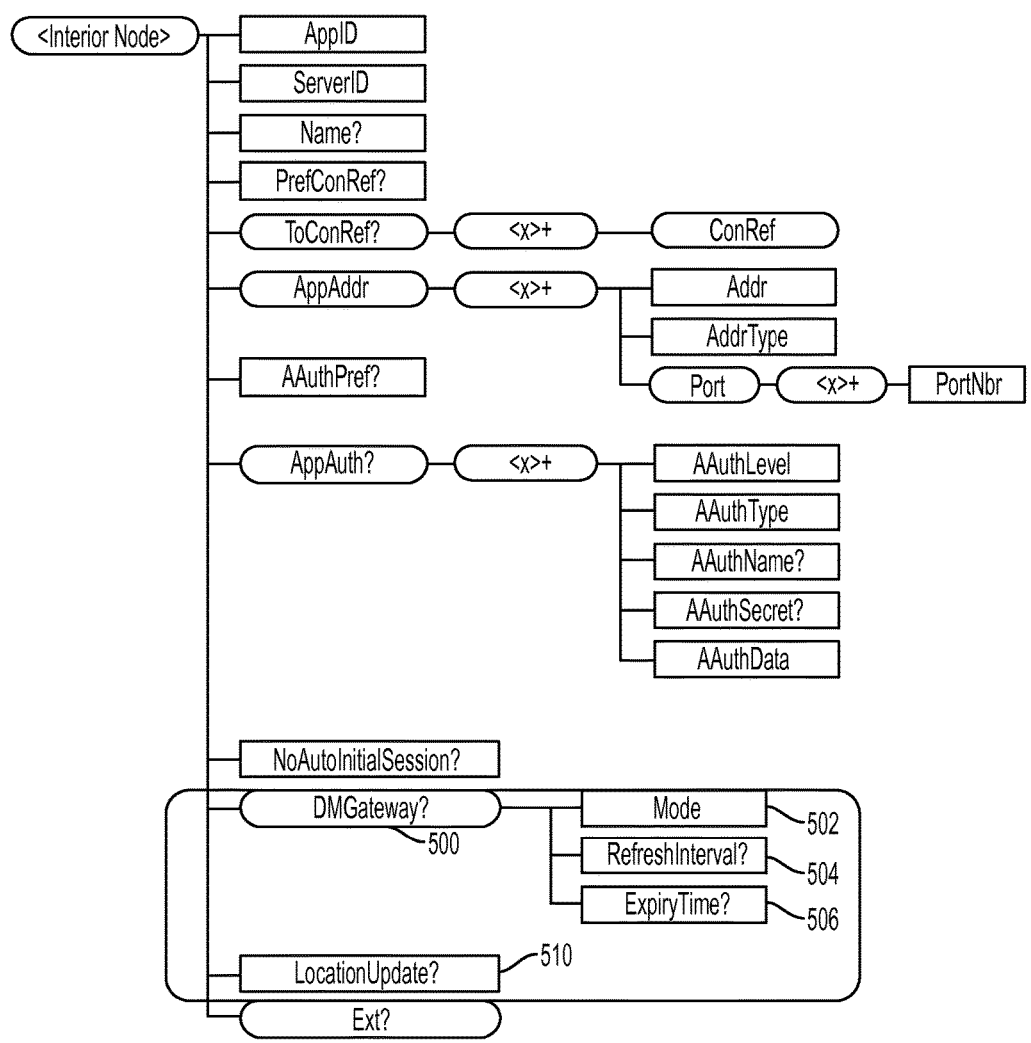
FIG. 5 illustrates a DMAcc MO node tree according to an exemplary embodiment of the present invention.

FIG. 5 illustrates a DMAcc MO node tree according to an exemplary embodiment of the present invention.

Referring to FIG. 5, the DMAcc MO node tree includes new nodes for DM Gateway bootstrapping and for supporting a Location Update Alert. The new nodes for DM Gateway bootstrapping include a DM Gateway (DMGateway) node 500, a Mode node 502, a Refresh Interval (RefreshInterval) node 504, and an Expiry Time (ExpiryTime) node 506, which are added to the DMAcc MO of the related art. The new node for supporting a Location Update Alert includes a Location Update (LocationUpdate) node 510, which is added to the DMAcc MO of the related art.

The specific node names (e.g., DMGateway, Mode, RefreshInterval, ExpiryTime, and LocationUpdate) referred to herein are merely illustrative; it is the function of the respective node that corresponds to exemplary embodiments of the present invention. The other nodes depicted in FIG. 5 are the nodes of the DMAcc MO of the related art depicted in FIG. 4 and are outside the scope of the present invention. Therefore a description of each these nodes is omitted herein for conciseness. The LocationUpdate node 510 will be described further below in the description of the Location Update Alert.

The DMGateway node 500 may be added to the DMAcc MO of the related art as a parent node for all leaf nodes pertaining to Gateway bootstrapping, including each of the Mode node 502, the RefreshInterval node 504, and the ExpiryTime node 506. The DMGateway node 500 is located in the DMAcc MO at Node: <x>/DMGateway. The DMGateway node 500 should not be present in a DMAcc MO pertaining to traditional DM Servers (i.e. DM Servers that do not provide the DM Gateway functionality). However, in certain exemplary embodiments, the DMGateway node 500 must not be present in a DMAcc MO pertaining to the traditional DM Servers. The DMGateway node 500 includes the properties shown in Table 1.

TABLE 1

| Status | Occurrence | Format | Minimum Access Types |
|---|---|---|---|
| Optional | ZeroOrOne | Node | Get |

The Mode node 502 may be added to the DMAcc MO of the related art to indicate the operation mode for the DM Gateway in question. The Mode node 502 is located in the DMAcc MO at Node: <x>/DMGateway/Mode. The Mode node 502 includes the properties shown in Table 2.

TABLE 2

| Status | Occurrence | Format | Minimum Access Types |
|---|---|---|---|
| Required | One | Integer | Get |

The permitted values of the Mode node 502 are shown in Table 3.

TABLE 3

| 0 | The DM Gateway is operating in a Transparent Mode. The DM Gateway maintains a mapping between the local/private and global/public identity of the device to assist the DM Server in sending a notification to the DM Client. |
| 1 | The DM Gateway is operating in a Proxy Mode. The DM Gateway manages the device on behalf of other OMA-DM Servers. |
| 2 | The DM Gateway is operating in a Protocol Adaptation Mode. The DM Gateway manages non-OMA-DM devices on behalf of other DM Servers. |

The RefreshInterval node 504 may be added to the DMAcc MO of the related art to specify the interval, in seconds, within which the device and the DM Gateway must exchange some communication in order for the DM Gateway bootstrapping information to remain valid. If the device and the DM Gateway do not exchange communication within this time interval, the device should automatically delete the DMAcc MO at the first available opportunity. If this node is not present in the DMAcc MO, the DM Gateway bootstrapping information should be deemed to be permanent. In certain exemplary embodiments, if this node is not present in the DMAcc MO, the DM Gateway bootstrapping information shall be deemed to be permanent. The RefreshInterval node 504 is located in the DMAcc MO at Node: <x>/DMGateway/RefreshInterval. The RefreshInterval node 504 includes the properties shown in Table 4.

TABLE 4

| Status | Occurrence | Format | Minimum Access Types |
|---|---|---|---|
| Optional | ZeroOrOne | Integer | Get, Replace |

The ExpiryTime node 506 may be added to the DMAcc MO of the related art to specify the instant of time, in an ISO8601 based basic format, at which the Gateway bootstrapping information in the device will lapse, unless renewed. If the device and the Gateway do not exchange communication before this instant, the Device should automatically delete the DMAcc MO at the first available opportunity. The value of this node should be updated if the Device and the Gateway exchange communication before the Refresh Interval elapses. In certain exemplary embodiments, the value of this node must be updated if the device and the Gateway exchange communication before the refresh interval elapses. If the Gateway bootstrapping information never lapses, the value of this node should be the keyword "Perpetual" (without quotes). In certain exemplary embodiments, if the Gateway bootstrapping information never lapses, the value of this node must be the keyword "Perpetual" (without quotes).

The ExpiryTime node 506 is located in the DMAcc MO at Node: <x>/DMGateway/ExpiryTime. The ExpiryTime node 506 includes the properties shown in Table 5.

TABLE 5

| Status | Occurrence | Format | Minimum Access Types |
|---|---|---|---|
| Optional | ZeroOrOne | Character | Get |

In an exemplary embodiment of the present invention, instead of adding new nodes to the DMAcc MO of the related art as described above, a new MO may be defined that includes the parent DMGateway node, and all leaf nodes pertaining to Gateway bootstrapping, including each of the Mode node, the RefreshInterval node, and the ExpiryTime node. In this exemplary embodiment of the present invention, the DMAcc MO may provide references to pertinent instances of the new MO.

Location Update Alert

There are occasions where a DM Server should know the current address of a nomadic device, which does not have a globally routable address, in order to send a DM notification to the device for establishing a DM session. This situation may be addressed by an exemplary embodiment of the present invention. In one exemplary implementation, a new alert and a new node may added to the DMAcc MO of the related art, such as the DMAcc MO described above with respect to FIG. 4. The new alert is referred to herein as the Location Update Alert. The new node added to the DMAcc MO of the related art is the LocationUpdate node 510 shown in FIG. 5.

The LocationUpdate node 510 may be added to the DMAcc MO of the related art to indicate whether or not the device should send a Location Update Alert to the DM Server at the earliest available opportunity upon detecting a change in its address. If the LocationUpdate node 510 is absent, its value defaults to false. The LocationUpdate node 510 is located in the DMAcc MO at Node: <x>/LocationUpdate. The LocationUpdate node 510 includes the properties shown in Table 6.

TABLE 6

| Status | Occurrence | Format | Minimum Access Types |
|---|---|---|---|
| Optional | ZeroOrOne | Boolean | Get, Replace |

The Location Update Alert can be issued at any time that the device detects that its address has changed. In other words, this alert can be issued in either Package 1 or Package 3. This alert may contain information on one or more of a hardware address of the device, an old address of the device, a new address of the device, etc.

The Location Update Alert may be based on the Generic Alert mechanism defined by the OMA-DM Protocol or a new alert type may be defined for this purpose.

In an exemplary embodiment of the present invention, instead of adding a new node to the DMAcc MO of the related art as described above, a new MO may be defined that includes the LocationUpdate node. In this exemplary embodiment of the present invention, the DMAcc MO may provide a reference to pertinent instance of the new MO.

An example of a Location Update Alert Synchronization Markup Language (SyncML) message that is based on the Generic Alert mechanism is shown in FIG. 6.

FIG. 6 illustrates a Location Update Alert SyncML message according to an exemplary embodiment of the present invention.

Referring to FIG. 6, a SyncML message for a Location Update Alert is shown. The particulars of the SyncML message depicted in FIG. 6 are outside the scope of the present disclosure and therefore a description thereof is omitted herein for conciseness.

An example of an algorithm for a device to issue the Location Update Alert to interested DM Servers upon restart is described below with reference to FIG. 7. As mentioned earlier, a device my issue the Location Update Alert whenever the device detects that its address has changed, not just at startup.

Figure 7:
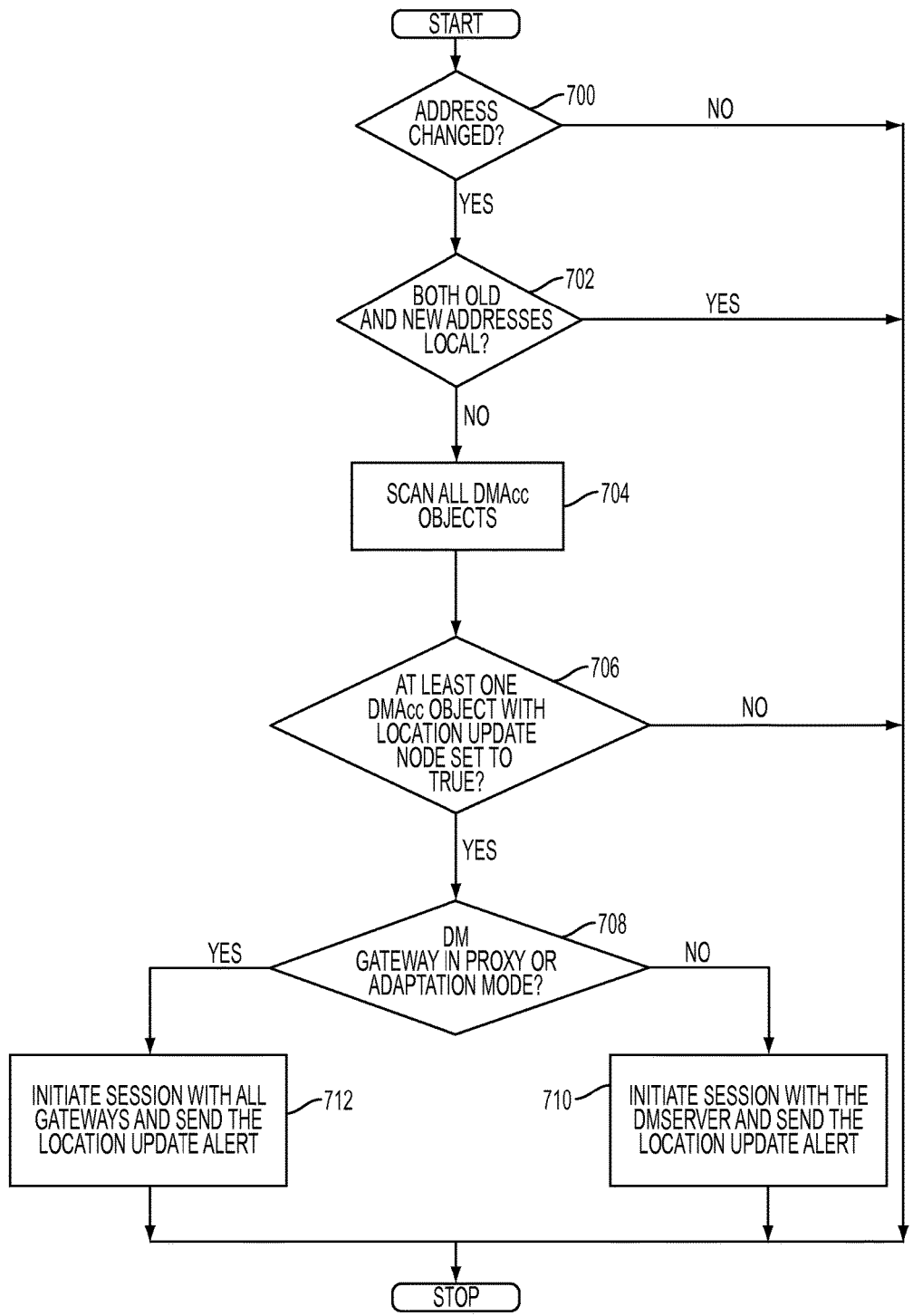
FIG. 7 is a flowchart illustrating an algorithm for a Device to issue a Location Update Alert to a DM Server according to an exemplary embodiment of the present invention.

FIG. 7 is a flowchart illustrating an algorithm for a Device to issue a Location Update Alert to a DM Server according to an exemplary embodiment of the present invention.

Referring to FIG. 7, the device, upon restart, determines whether or not its address has changed in step 700. If the device determines that there has not been a change in the address of the device at step 700, the algorithm terminates. In contrast, if the device determines that there has been a change in the address of the device at step 700, the device determines whether or not that the address change is from one local address to another local address in step 702. If the device determines that both the old and new addresses are local to the network at step 702, the algorithm terminates. In contrast, if the device determines that both the old and new addresses are not local to the network at step 702, the device scans all the DMAcc MOs in step 704 and determines in step 706 if at least one instance of a DMAcc MO is located for which the LocationUpdate node has a value set to true. If the device determines at step 706 that there are no instances of a of a DMAcc MO located for which the LocationUpdate node has a value set to true, none of the bootstrapped DM Servers need to be updated with the new address of the device, and thus the algorithm terminates. In contrast, if the device determines at step 706 that is at least one instance of a DMAcc MO located for which the LocationUpdate node has a value set to true (at least one bootstrapped DM Server needs to be updated with the new address information), the device determines in step 708 if there is at least one DM Gateway in Proxy or Adaptation mode. This is determined by looking for DMAcc MO instances which contain the <x>/DMGateway/Mode node that is set to a value of Proxy or Protocol Adaptation. If the device determines at step 708 that there is not at least one deployed DM Gateway in Proxy or Adaptation mode, the Location Update Alert is sent directly to the DM Servers for which the LocationUpdate node has a value set to true in step 710. In contrast, if the device determines at step 708 that there is at least one deployed DM Gateway in Proxy or Adaptation mode, the Location Update Alert is sent to all the DM Gateways that are deployed in the Proxy or Adaptation mode and for which the LocationUpdate node has a value set to true in step 712.

Expanded Role of Local Area Network (LAN) Device Inventory MO

Hereafter, enhancements to the OMA-DM protocol according to exemplary embodiments of the present invention are described that enable a DM Gateway to forward messages from a DM Server to an associated device in the case where the DM Gateway is not bootstrapped to the DM Server in question whereas the associated device is.

U.S. patent application Ser. No. 12/846,661, which was filed on Jul. 29, 2010, the entire disclosure of which is hereby incorporated by reference, introduces a new MO that is referred to as the LAN Device Inventory MO. The LAN Device Inventory MO maintains a list of devices in the LAN that are associated with the DM Gateway. The LAN Device Inventory MO is populated by the DM Client running on the Gateway, as and when it gets associated/disassociated with devices in the LAN. Among other things, the LAN Device Inventory MO may maintains the following one or more items of information about each device discovered in the LAN:

Device type and/or device sub-type;
Device hardware address (i.e., Media Access Control (MAC) address, International Mobile Equipment Identity (IMEI), Mobile Equipment Identifier (MEID), etc.);
Validity Expiration Time (i.e. time after which the device entry will be removed from the inventory, unless a new heartbeat message is received by the DM Gateway)

Herein, the role of the LAN Device Inventory MO is expanded, according to an exemplary embodiment of the present invention, by including in the LAN Device Inventory MO the identifiers for all DM Servers with which the DM Client, residing on the end device, is bootstrapped, if any. When a device first detects that it is associated with a DM Gateway (as discussed in U.S. patent application Ser. No. 12/846,661), it sends the DM Server IDs of all the DM Servers that it is bootstrapped with, in a Generic Alert message. This Generic Alert is referred to herein as the Bootstrapped DM Server List Alert, an example of which is shown in FIG. 8.

FIG. 8 illustrates a Bootstrapped DM Server List Alert SyncML message according to an exemplary embodiment of the present invention.

Referring to FIG. 8, a SyncML message for a Bootstrapped DM Server List Alert is shown. The particulars of the SyncML message depicted in FIG. 8 are outside the scope of the present disclosure and therefore a description thereof is omitted herein for conciseness.

Upon receiving the Bootstrapped DM Server List Alert, the DM Gateway updates the corresponding entry for the device in question in the LAN Device Inventory MO. In order to improve the processing by the DM Gateway of the Package 0 message that is destined for an associated device, the OMA-DM version 1.3 Notification Message structure may be modified according to an exemplary embodiment of the present invention. More specifically, a <reason-data> field of the OMA-DM version 1.3 Notification Message may be substituted with a <reason-code> field according to an exemplary embodiment of the present invention. In addition, an <moi-data> field of the OMA-DM version 1.3 Notification Message may be substituted with a <moi-code> field according to an exemplary embodiment of the present invention. The structure of the OMA-DM version 1.3 Notification Message including the <reason-data> and <moi-data> fields is shown in FIG. 9A and the structure of the Notification Message including the <reason-code> and <moi-code> fields according to an exemplary embodiment of the present invention is shown in FIG. 9B.

FIG. 9A illustrates a structure of a Notification Message including <reason-data> and <moi-data> fields according to the related art. FIG. 9B illustrates a structure of the Notification Message including <reason-code> and <moi-code> fields according to an exemplary embodiment of the present invention.

Referring to FIGS. 9A and 9B, a pictorial description of a structure of a Notification Message of OMA-DM version 1.3 including a <reason-data> field 900 and a <moi-data> field 901, and a structure of a Notification Message including a <reason-code> field 902 and <moi-code> field 903 are shown, respectively. It is noted that the particulars of the fields depicted in FIGS. 9A and 9B that not discussed herein are outside the scope of the present disclosure and therefore their description is omitted herein for conciseness. A description of each of the fields depicted in FIGS. 9A and 9B that are not discussed herein can be found in section 6.2 of version 1.3 of the OMA DM Notification TS, the entire disclosure of which is hereby incorporated by reference. According to an exemplary embodiment of the present invention, a bit set to true in a <moi-present> field 905 may indicate that the <moi-code> field 903 is present in the Notification Message. Similarly, a bit set to true in a <reason-present> field 904 may indicate that the <reason-code> field 902 is present in the Notification Message. The <moi-present> field 905 and the <reason-present> field 904 are 1 bit fields located in the heading of the Notification Message.

The purpose of the <moi-data> field 901 is to proactively indicate to the DM Client which MO is being managed in the subsequent management session. The same effect can be achieved by maintaining a binding between the MO identifier and an MO identifier code in some MO and only specifying the MO identifier code in the <moi-code> field 903 in the Notification message. The <moi-code> field 903 may be an 8 bit field that will allow up to 256 MO identifiers to be specified at any given time, which should be more than adequate for most needs.

The purpose of the <reason-data> field 900 is to proactively indicate to the DM Client the reason for establishing a DM session. The same effect can be achieved by maintaining a binding between the reason string and a reason code in some MO and only specifying the reason code in the <reason-code> field 902 in the Notification message. The <reason-code> field 902 may be an 8 bit field that will allow up to 256 reasons for establishing the management session to be specified at any given time, which should be more than adequate for most needs.

The binding between the reason-code and the reason-string can be either provided in one of the existing MOs, or in a new MO.

Blacklist of DM Servers

The DM Gateway only has information about the server identifiers of the DM Servers that the target device is bootstrapped to. The DM Gateway does not maintain the credentials of these DM Servers. Because of this, the DM Gateway is susceptible to denial-of-service attacks. As a preventive measure, a Blacklist of DM Servers may be maintained according to an exemplary embodiment of the present invention. Messages from DM Servers on the blacklist are summarily rejected, unless explicitly allowed by a management command issued from a DM Server to which the DM Gateway is bootstrapped. The DM Server Blacklist can be either provided in one of the existing MOs, or in a new MO. An example of a DM Gateway processing messages from a DM Server is described below with reference to FIG. 10.

Figure 10:
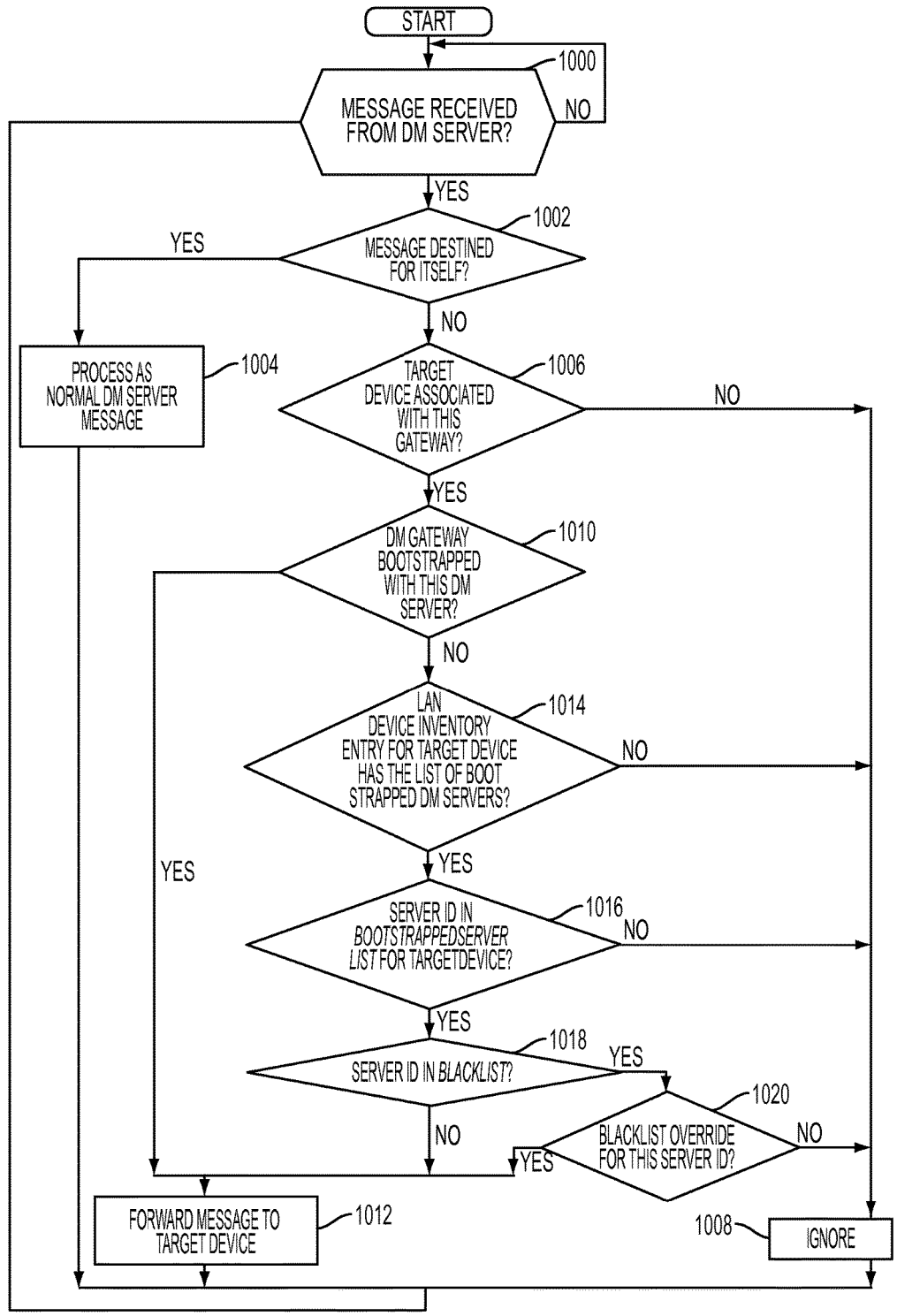
FIG. 10 is a flowchart illustrating an algorithm for a DM Gateway to process messages from a DM Server according to an exemplary embodiment of the present invention.

FIG. 10 is a flowchart illustrating an algorithm for a DM Gateway to process messages from a DM Server according to an exemplary embodiment of the present invention.

Referring to FIG. 10, the DM Gateway waits for a message to be received from a DM Server in step 1000. Once a message is received from the DM Server, the DM Gateway determines whether the message is destined for itself in step 1002. If the DM Gateway determines that the message is destined for itself at step 1002, the DM Gateway processes the received message as a normal DM message in step 1004. Thereafter the algorithm returns to step 1000. In contrast, if the DM Gateway determines that the message is not destined for itself at step 1002, the DM Gateway determines whether the target device is a device the DM Gateway is associated with in step 1006. In one exemplary embodiment, the DM Gateway can determine if the target device is a device the DM Gateway is associated with by determining if the target device has an entry in the LAN Device Inventory MO.

If the DM Gateway determines that the target device is not an associated device at step 1006, the message is ignored in step 1008. Thereafter the algorithm returns to step 1000. In contrast, if the DM Gateway determines that the target device is an associated device at step 1006, the DM Gateway determines whether it is bootstrapped to the DM Server that sent the message in step 1010. If the DM Gateway determines that it is bootstrapped to the DM Server that sent the message at step 1010, the DM Gateway forwards the message to the target device in step 1012. Thereafter the algorithm returns to step 1000. In contrast, if the DM Gateway determines that it is not bootstrapped to the DM Server that sent the message at step 1010, the DM Gateway determines whether the LAN Device Inventory MO entry for the target device has a list of bootstrapped servers for the device in step 1014. If the DM Gateway determines that the LAN Device Inventory MO entry for the target device has a list of bootstrapped servers for the device at step 1014, the DM Server ID is not in the LAN Device Inventory entry for the target device, and thus the DM Gateway ignores the message in step 1008. Thereafter the algorithm returns to step 1000. In contrast, if the DM Gateway determines that the LAN Device Inventory MO entry for the target device does not have a list of bootstrapped servers for the device at step 1014, the DM Gateway determines whether the Server ID is included in the Bootstrap Server List for the target device in step 1016. If the DM Gateway determines that the Server ID is included in the Bootstrap Server List for the target device at step 1016, the DM Gateway ignores the message in step 1008. Thereafter the algorithm returns to step 1000. In contrast, if the DM Gateway determines that the Server ID is in the Bootstrap Server List for the target device at step 1016, the DM Gateway determines whether the Server ID is included in the DM Gateway's Blacklist in step 1018. If the DM Gateway determines that the Server ID is not included in the DM Gateway's Blacklist at step 1018, the DM Gateway forwards the message to the target device in step 1012. Thereafter the algorithm returns to step 1000. In contrast, if the DM Gateway determines that the Server ID is included in the DM Gateway's Blacklist at step 1018, the DM Gateway determines whether there is a management override against the blacklisting of the DM Server that sent the message in step 1020. If the DM Gateway determines that there is a management override against the blacklisting of the DM Server ID at step 1020, the DM Gateway forwards the message to the target device in step 1012. Thereafter the algorithm returns to step 1000. In contrast, if the DM Gateway determines that there is not a management override against the blacklisting of the DM Server ID at step 1020, the DM Gateway ignores the message in step 1008. Thereafter the algorithm returns to step 1000.

A structure of a device including a DM Client according to an exemplary embodiment of the present invention will be described below with reference to FIG. 11.

Figure 11:
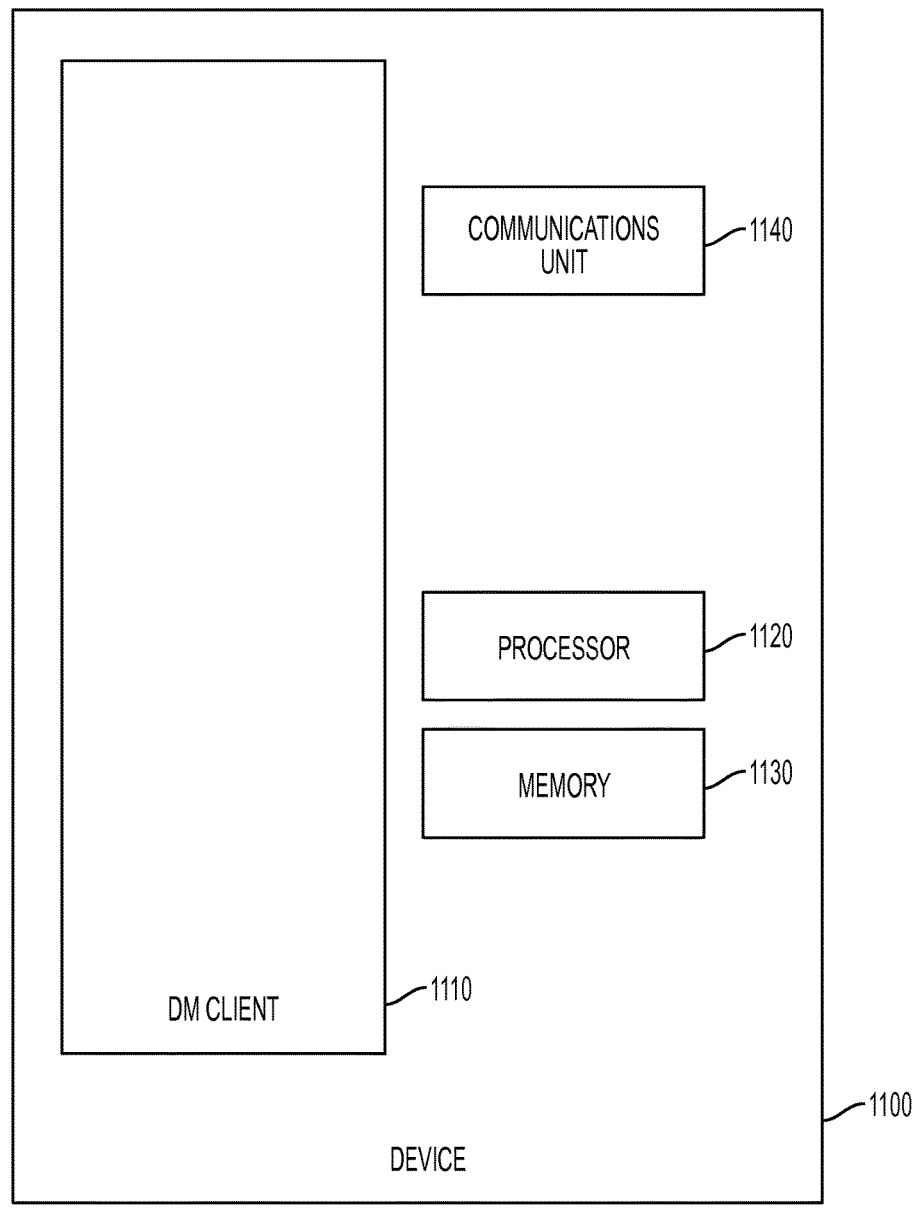
FIG. 11 is a block diagram of a device including a DM Client according to an exemplary embodiment of the present invention.

FIG. 11 is a block diagram of a device including a DM Client according to an exemplary embodiment of the present invention.

Referring to FIG. 11, the device 1100 includes a DM Client 1110, a processor 1120, a memory 1130, and a communications unit 1140. The device 1100 may include any number of additional structural elements. However, a description of additional structural elements of device 1100 is omitted for conciseness.

The DM Client 1110 may be implemented as code that is executed by the processor 1120 or may be implemented as hardware. The term "code" may be used herein to represent one or more of executable instructions, operand data, configuration parameters, and other information stored in memory 1130 of the device 1100. The operations of the DM Client 1110 include any of the operations explicitly or implicitly described above as being performed by a DM Client.

The processor 1120 is used to process general operations of the device 1100 and may be used to execute the code of the DM Client 1110.

The memory 1130 may store the code of the DM Client 1110 in addition to one or more of executable instructions, operand data, configuration parameters, and other information stored of the device 1100. Depending on the exact configuration and type of device, memory 1130 may be volatile (such as Random Access Memory (RAM)), non-volatile (such as Read Only Memory (ROM), flash memory, etc.) or some combination of thereof.

The communications unit 1140 sends and receives data between the DM Client 1110 and other entities, such as a DM Gateway, DM server, etc. The communications unit 1140 may includes any number of transceivers, receivers, and transmitters of any number of types, such as wired, wireless, etc.

A structure of a DM Gateway device according to an exemplary embodiment of the present invention will be described below with reference to FIG. 12.

Figure 12:
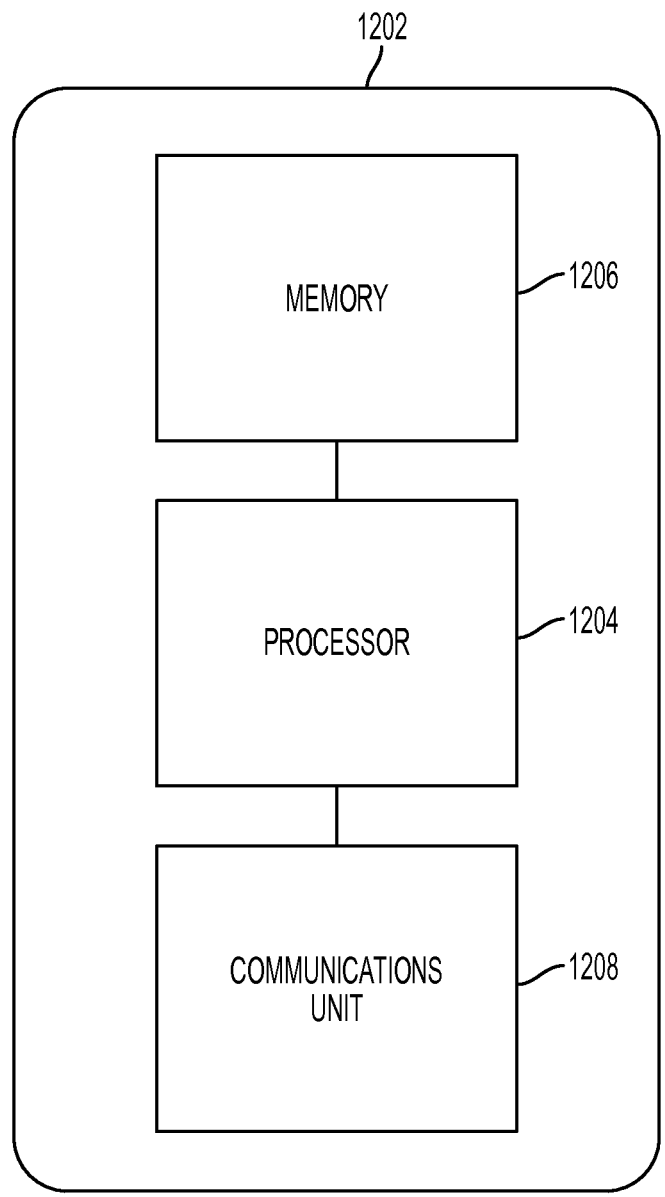
FIG. 12 is a block diagram of a DM Gateway according to an exemplary embodiment of the present invention.

FIG. 12 is a block diagram of a DM Gateway according to an exemplary embodiment of the present invention.

Referring to FIG. 12, the DM Gateway 1202 includes a processor 1204, a memory 1206, and a communications unit 1208. The DM Gateway 1202 may include any number of additional structural elements. However, a description of additional structural elements of the DM Gateway 1202 is omitted for conciseness.

The processor 1204 is used to process general operations of the DM Gateway 1202 and may be used to execute code to perform any of the functions/operations/algorithms/roles explicitly or implicitly described herein as being performed by a DM Gateway. Further, the processor 1204 may communicate with and/or control the memory 1206 and/or the communications unit 1208. The term "code" may be used herein to represent one or more of executable instructions, operand data, configuration parameters, and other information stored in memory 1206.

The memory 1206 may store code that is processed by the processor 1204 to execute any of the functions/operations/algorithms/roles explicitly or implicitly described herein as being performed by a DM Gateway. In addition, one or more of other executable instructions, operand data, configuration parameters, and other information may be stored in the memory 1206. Depending on the exact configuration of the DM Gateway 1202, memory 1206 may be volatile (such as Random Access Memory (RAM)), non-volatile (such as Read Only Memory (ROM), flash memory, etc.) or some combination thereof.

The communications unit 1208 transmits and receives data between one or more of a device, a DM Server and other entities. The communications unit 1208 may includes any number of transceivers, receivers, and transmitters of any number of types, such as wired, wireless, etc.

A structure of a DM Server device according to an exemplary embodiment of the present invention may be substantially the same as the structure of a DM Gateway described above with reference to FIG. 12. Accordingly, a description thereof is omitted for conciseness.

Certain aspects of the present invention may also be embodied as computer readable code on a computer readable recording medium. A computer readable recording medium is any data storage device that can store data, which can be thereafter read by a computer system. Examples of the computer readable recording medium include ROM, RAM, Compact Disc (CD)-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A device for performing device management (DM) gateway bootstrapping, the device comprising:
a memory configured to store code for bootstrapping a DM client to DM gateways and code of a plurality of DM management objects (MOs) for bootstrapping the DM client to DM gateways;
a processor configured to execute the code for bootstrapping the DM client to DM gateways stored in the memory to bootstrap the DM client to a DM gateway; and
a communications unit configured to receive messages from and send messages to the DM gateway for the DM client,
wherein the communications unit is configured to send a message to the DM client indicating a management mode in which the DM gateway will manage the DM client, wherein:
when the message indicates that the management mode is a transparent mode, the DM client is configured to receive a notification from the DM gateway based on a mapping for the DM client even though the DM Gateway is not bootstrapped to a DM Server,
when the message indicates that the management mode is a proxy mode, the DM client is configured to be managed by the DM gateway on behalf of another DM server, and
when the message indicates that the management mode is an adaptation mode, the DM client, if executing within a device that is not an Open Mobile Alliance (OMA)-DM device, is configured to be managed by the DM gateway on behalf of another DM server.

2. The device of claim 1, wherein each of the plurality of DM MOs includes one or more nodes, the one or more nodes comprising a mode node comprising the properties:

| Status | Occurrence | Format | Minimum Access Types |
| --- | --- | --- | --- |
| Required | One | Integer | Get, | and
wherein the mode node identifies whether the DM gateway is operating in the transparent mode, the proxy mode, or the adaptation mode.

3. The device of claim 2, wherein at least one node of the one or more nodes, based on which the DM client performs DM gateway bootstrapping, is referenced in a DM account (DMAcc) MO.

4. The device of claim 2, wherein at least one of the plurality of DM MOs includes the node based on which the DM client performs the DM gateway bootstrapping and does not comprise a DM account (DMAcc) MO.

5. The device of claim 2, wherein the at least one node comprises a DM gateway node.

6. The device of claim 5, wherein the DM gateway node comprises the properties:

| Status | Occurrence | Format | Minimum Access Types |
| --- | --- | --- | --- |
| Optional | ZeroOrOne | Node | Get. |

7. The device of claim 2, wherein the at least one node comprises a DM gateway node that is a parent node to the mode node.

8. The device of claim 2, wherein the at least one node comprises a refresh interval node that specifies an interval within which the device and the DM gateway must exchange a communication in order for the DM gateway bootstrapping information to remain valid.

9. The device of claim 8, wherein the refresh interval node comprises the properties:

| Status | Occurrence | Format | Minimum Access Types |
| --- | --- | --- | --- |
| Optional | ZeroOrOne | Node | Get, Replace. |

10. The device of claim 8, wherein the at least one node comprises a DM gateway node that is a parent node to the refresh interval node.

11. A method for a device management (DM) gateway to process messages from a DM server, the method comprising:
receiving a message from a DM server for a target device associated with the DM gateway;
determining whether the DM gateway is bootstrapped to the DM server that sent the message;
if it is determined that the DM gateway is not bootstrapped to the DM server that sent the message, determining whether the DM gateway should forward the message to the target device despite the DM gateway not being bootstrapped to the DM server that sent the message; and
if it is determined that the DM gateway should forward the message to the target device despite the DM gateway not being bootstrapped to the DM server that sent the message, forwarding the message to the target device.

12. The method of claim 11, wherein the receiving of the message from a DM server for the target device associated with the DM gateway comprises:
receiving the message from a DM server; and
determining whether the target device of the received message is associated with the DM gateway by determining whether the target device has an entry in a local area network (LAN) device inventory MO.

13. The method of claim 11, wherein the determining of whether the DM gateway should forward the message to the target device despite the DM gateway not being bootstrapped to the DM server that sent the message comprises:
determining whether a local area network (LAN) device inventory MO entry for the target device includes the DM server that sent the message in a list of bootstrapped servers for the target device.

14. The method of claim 13, wherein the determining of whether the DM gateway should forward the message to the target device despite the DM gateway not being bootstrapped to the DM server that sent the message further comprises:
if it is determined that the DM server that sent the message is included in a list of bootstrapped servers for the target device, determining whether the DM server that sent the message is included in a blacklist of the DM gateway; and
if it is determined that the DM server that sent the message is not included in the blacklist, forwarding the message to the target device.

15. The method of claim 14, wherein the determining of whether the DM gateway should forward the message to the target device despite the DM gateway not being bootstrapped to the DM server that sent the message further comprises:
if it is determined that the DM server that sent the message is included in the blacklist, determining whether there is a management override against the blacklisting of the DM server that sent the message, and if it is determined that there is a management override against the blacklisting of the DM server that sent the message, forwarding the message to the target device.

16. A method for performing device management (DM) gateway bootstrapping of a device, the method comprising:
storing, in a memory within the device, code for bootstrapping a DM client to DM gateways and code of a plurality of DM management objects (MOs) for bootstrapping the DM client to DM gateways;
executing, by a processor within the device, the code for bootstrapping the DM client to DM gateways stored in the memory to bootstrap the DM client to a DM gateway; and
using a communications unit within the device, at least one of receiving messages from and sending messages to the DM gateway for the DM client,
wherein the communications unit is configured to send a message to the DM client indicating a management mode in which the DM gateway will manage the DM client following bootstrapping, wherein:
when the message indicates that the management mode is a transparent mode, the DM client is configured to receive a notification from the DM gateway based on a mapping for the DM client even though the DM Gateway is not bootstrapped to a DM Server,
when the message indicates that the management mode is a proxy mode, the DM client is configured to be managed by the DM gateway on behalf of another DM server, and
when the message indicates that the management mode is an adaptation mode, the DM client, if executing within a device that is not an Open Mobile Alliance (OMA)-DM device, is configured to be managed by the DM gateway on behalf of another DM server.

17. The method of claim 16, wherein each of the plurality of DM MOs including one or more nodes, the one or more nodes comprising a mode node comprising the properties:

| Status | Occurrence | Format | Minimum Access Types |
|---|---|---|---|
| Required | One | Integer | Get; | and
wherein the mode node identifies whether the DM gateway is operating in the transparent mode, the proxy mode, or the adaptation mode.

18. The method of claim 17, wherein at least one node of the one or more nodes, based on which the DM client performs the DM gateway bootstrapping, is referenced in a DM account (DMAcc) MO.

19. The method of claim 17, wherein at least one of the plurality of DM MOs includes the node based on which the DM client performs the DM gateway bootstrapping and does not comprise a DM account (DMAcc) MO.

20. The method of claim 17, wherein the at least one node comprises a DM gateway node.

21. The method of claim 20, wherein the DM gateway node comprises the properties:

| Status | Occurrence | Format | Minimum Access Types |
|---|---|---|---|
| Optional | ZeroOrOne | Node | Get. |

22. The method of claim 17, wherein the at least one node comprises a DM gateway node that is a parent node to the mode node.

23. The method of claim 17, wherein the at least one node comprises a refresh interval node that specifies an interval within which the device and the DM gateway must exchange a communication in order for the DM gateway bootstrapping information to remain valid.

24. The method of claim 23, wherein the refresh interval node comprises the properties:

| Status | Occurrence | Format | Minimum Access Types |
|---|---|---|---|
| Optional | ZeroOrOne | Node | Get, Replace. |

25. The method of claim 23, wherein the at least one node comprises a DM gateway node that is a parent node to the refresh interval node.

26. An apparatus in a device management (DM) gateway to process messages from a DM server, the apparatus comprising:
a communications unit configured to receive a message from a DM server for a target device associated with the DM gateway;
a processor configured to
determine whether the DM gateway is bootstrapped to the DM server that sent the message, and
in response to determining that that the DM gateway is not bootstrapped to the DM server that sent the message, determine whether the DM gateway should forward the message to the target device despite the DM gateway not being bootstrapped to the DM server that sent the message, and
in response to determining that the DM gateway should forward the message to the target device despite the DM gateway not being bootstrapped to the DM server that sent the message, forward the message to the target device.

27. The apparatus of claim 26, wherein the communications unit is configured to receive the message from a DM server, and wherein the processor is configured to determine whether the target device of the received message is associated with the DM gateway by determining whether the target device has an entry in a local area network (LAN) device inventory MO.

28. The apparatus of claim 26, wherein the processor, in determining whether the DM gateway should forward the message to the target device despite the DM gateway not being bootstrapped to the DM server that sent the message, is configured to determine whether a local area network (LAN) device inventory MO entry for the target device includes the DM server that sent the message in a list of bootstrapped servers for the target device.

29. The apparatus of claim 28, wherein the processor, in determining whether the DM gateway should forward the message to the target device despite the DM gateway not being bootstrapped to the DM server that sent the message, is configured to:

if it is determined that the DM server that sent the message is included in a list of bootstrapped servers for the target device, determine whether the DM server that sent the message is included in a blacklist of the DM gateway, and if it is determined that the DM server that sent the message is not included in the blacklist, forward the message to the target device.

30. The apparatus of claim 29, wherein the processor, in determining whether the DM gateway should forward the message to the target device despite the DM gateway not being bootstrapped to the DM server that sent the message, is configured to:

if it is determined that the DM server that sent the message is included in the blacklist, determine whether there is a management override against the blacklisting of the DM server that sent the message, and if it is determined that there is a management override against the blacklisting of the DM server that sent the message, forward the message to the target device.

* * * * *